(12) United States Patent
Oota et al.

(10) Patent No.: US 6,848,436 B2
(45) Date of Patent: Feb. 1, 2005

(54) INTERNAL COMBUSTION ENGINE WITH BLOW-BY GAS RECIRCULATION SYSTEM

(75) Inventors: Hajime Oota, Tochigi (JP); Tarou Ueno, Yokohama (JP); Shigekazu Fuji, Yokohama (JP)

(73) Assignees: Nissan Motor Co., Ltd., Yokohama (JP); Renault s.a.s. societe par actions simplifiee, Boulogne-Billancourt (FR)

( * ) Notice: Subject to any disclaimer, the term of this patent is extended or adjusted under 35 U.S.C. 154(b) by 0 days.

(21) Appl. No.: 10/823,621

(22) Filed: Apr. 14, 2004

(65) Prior Publication Data

US 2004/0206343 A1 Oct. 21, 2004

(30) Foreign Application Priority Data

Apr. 15, 2003 (JP) ........................................ 2003-109698

(51) Int. Cl.[7] .............................................. F01M 13/00
(52) U.S. Cl. ...................................................... 123/572
(58) Field of Search .................................. 123/572–574

(56) References Cited

U.S. PATENT DOCUMENTS 4,760,833 A * 8/1988 Tatyrek ...................... 123/574
6,192,848 B1 * 2/2001 Hada et al. ............. 123/184.24
6,247,464 B1 * 6/2001 Maegawa et al. ........... 123/572
6,659,093 B2 * 12/2003 Kim ........................... 123/572

FOREIGN PATENT DOCUMENTS

| JP | 8-200033 A | 8/1996 |
|---|---|---|
| JP | 2002-106419 A | 4/2002 |

* cited by examiner

Primary Examiner—Marguerite McMahon
(74) Attorney, Agent, or Firm—Foley & Lardner LLP

(57) ABSTRACT

An automotive internal combustion engine comprises an engine main body including a cylinder head having intake ports, and a cylinder head cover. Fuel injector valves are disposed to be directed respectively to the intake ports. An intake manifold is installed to a side surface of the cylinder head and outward curved to define a space between the intake manifold and the cylinder head. A blow-by gas recirculation system is provided for feeding blow-by gas introduced out of the cylinder head cover to each cylinder of the engine main body through an intake system. The blow-by gas recirculation system includes a blow-by gas piping which extends from the cylinder head cover to the intake ports for the cylinders. The blow-by gas piping is accommodated within the space defined between the intake manifold and the cylinder head.

10 Claims, 4 Drawing Sheets

INTERNAL COMBUSTION ENGINE WITH BLOW-BY GAS RECIRCULATION SYSTEM

BACKGROUND OF THE INVENTION

This invention relates to improvements in an internal combustion engine equipped with a blow-by gas recirculation system arranged to recirculated or feed blow-by gas inside a crankcase through a valve operating chamber of a cylinder head to an intake system, particularly the improvements in the blow-by gas recirculation system having a flow passage structure in which blow-by gas is introduced for each cylinder through an outside piping located outside an engine main body.

As disclosed in Japanese Patent Provisional Publication No. 8-200033, it is well known that blow-by gas of an internal combustion engine is recirculated or fed from a blow-by gas output formed in a cylinder head cover through the outside piping such as a rubber hose to an intake air passage for each cylinder.

SUMMARY OF THE INVENTION

However, in such a conventional arrangement that the outside piping is used as a blow-by gas passage, blow-by gas tends to readily give rise to icing within the blow-by gas passage under the action of flowing air generated during vehicle running in a cold district because much water vapor is contained in blow-by gas.

Therefore, it is an object of the present invention to provide an improved internal combustion engine equipped with a blow-by gas recirculation system, which can effectively overcome drawbacks encountered in conventional engines provided with a blow-gas recirculation system.

Another object of the present invention is to provide an improved internal combustion engine equipped with a blow-by gas recirculation system, in which blow-by gas can be effectively prevented from icing even during vehicle running in a cold district.

A further object of the present invention is to provide an improved internal combustion engine equipped with a blow-by gas recirculation system, in which a blow-by gas piping can be effectively protected from being subjected to cooling by flowing air even during vehicle running while being effectively warmed, though the blow-by gas piping is formed as an outside piping to an engine main body.

A still further object of the present invention is to provide an improved combustion engine equipped with a blow-by gas recirculation system, in which a blow-by gas piping is accommodated together with fuel injector valves within a space defined between an outer surface of an engine main body and an intake manifold.

According to the present invention, an internal combustion engine comprises an engine main body including a cylinder head having intake ports, and a cylinder head cover. Fuel injector valves are disposed to be directed respectively to the intake ports. An intake manifold is installed to a side surface of the cylinder head and outward curved to define a space between the intake manifold and the cylinder head. A blow-by gas recirculation system is provided for feeding blow-by gas introduced out of the cylinder head cover to each cylinder of the engine main body through an intake system. The blow-by gas recirculation system includes a blow-by gas piping which extends from the cylinder head cover to the intake ports for the cylinders. The blow-by gas piping is accommodated within the space defined between the intake manifold and the cylinder head.

DETAILED DESCRIPTION OF THE INVENTION

Figure 1:
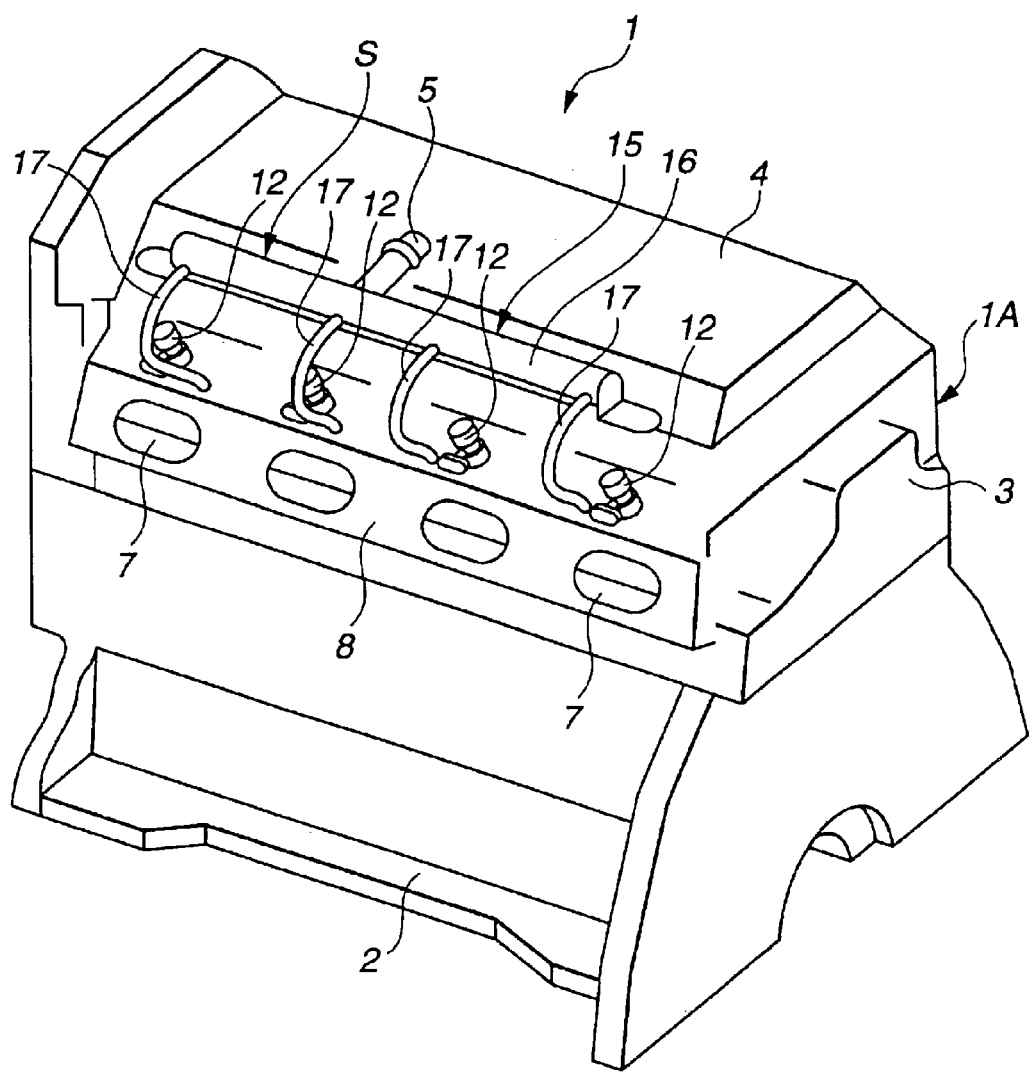
FIG. 1 is a perspective view of an essential part of an embodiment of an internal combustion engine according to the present invention, equipped with a blow-by recirculation system, in a state where an intake manifold is removed.

Referring now to FIG. 1, an embodiment of internal combustion engine according to the present invention is illustrated by the reference numeral 1 and provided with blow-by gas recirculation system S. Engine 1 is gasoline-fueled and of the in-line 4-cylinder type. Engine 1 is forward and transversely mounted on a front-wheel-driving automotive vehicle, though not shown. Engine 1 includes engine main body 1A which includes a cylinder block 2 having an upper surface on which cylinder head 3 is fixedly mounted. Cylinder head cover 4 is mounted on cylinder head 3 in such a manner as to cover the upper surface depression of cylinder head 3. In such engine 1, blow-by gas within a crank case (not shown) once flows into a valve operating chamber (not identified) formed in cylinder head 3, then flows through an oil separator (not shown) disposed inside cylinder head cover 4, and thereafter flows out through is blow-by gas outlet 5 disposed at the central portion of the top section of cylinder head cover 4.

Figure 2:
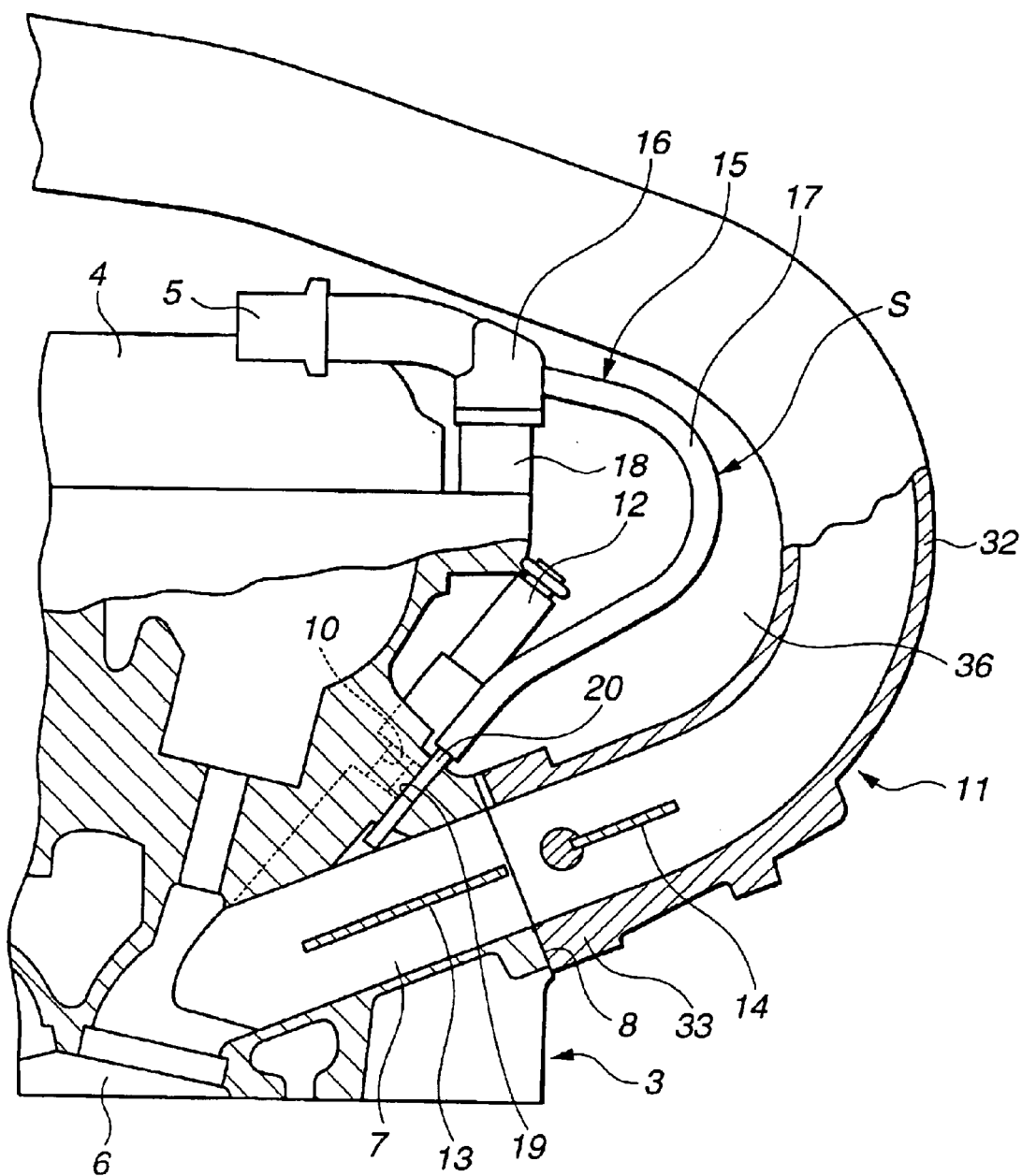
FIG. 2 is a fragmentary vertical sectional view of an essential part of the internal combustion engine of FIG. 1, including a cylinder head and an intake manifold.
Figure 3:
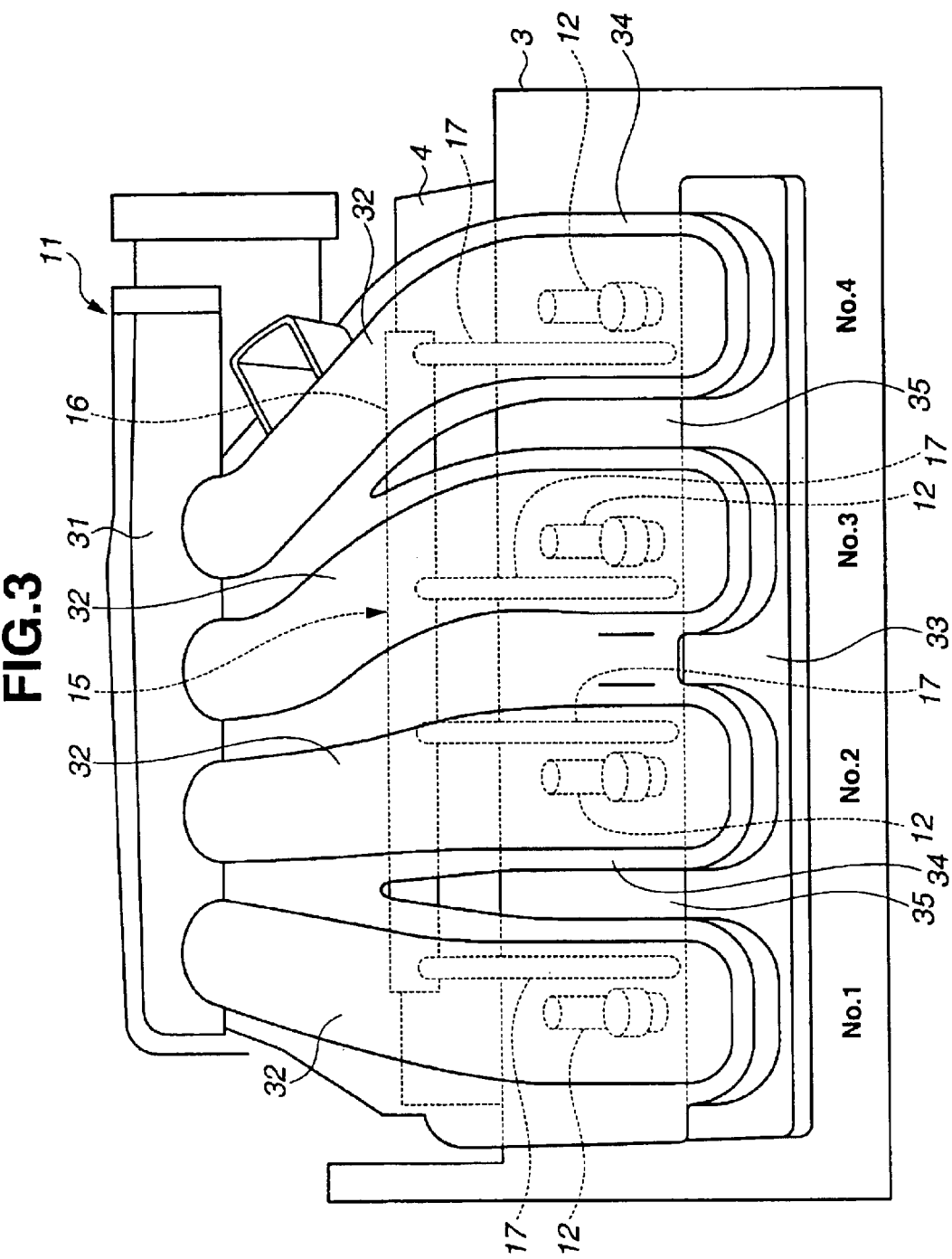
FIG. 3 is a side elevation of the essential part of the internal combustion engine of FIG. 1, including the cylinder head and the intake manifold.

Cylinder head 3 of this instance is formed with the upper parts of four pent roof type combustion chambers 6 as shown in FIG. 2 and provided with a DOHC type valve operating mechanism (not shown). Each combustion chamber 6 corresponds to one of four cylinders (not shown) formed in cylinder block 2. Cylinder head 3 is formed with four intake ports 7 each of which has an upstream section having a generally elliptic cross-section so as to be elongate in a longitudinal (or fore-and-aft) direction of engine main body 1A. The longitudinal direction is parallel with a direction in which the axis of a crankshaft (not shown) of engine 1 extends. The upstream section of each intake port 7 is opened to a side surface of cylinder head 3. A downstream section of each intake port 7 forks into two downstream portions which are provided respectively with two intake valves (not shown). In this instance, each intake port 7 is relatively raised for the purpose of obtaining a tumble flow of intake air in each cylinder, so that cylinder head 3 has intake manifold installation flange surface 8 which is inclined relative to an imaginary vertical plane passing the axis of the crankshaft (not shown) of engine 1 so as to be upwardly obliquely faced as clearly shown in FIG. 2. Intake manifold which will be discussed after is installed to the intake manifold installation flange surface 8 as shown in FIGS. 2 and 3. Engine 1 shown in FIG. 1 is in a state where this intake manifold 11 is removed.

Electromagnetically operated fuel injector valves 12 are installed to cylinder head 3 and located respectively at portions above intake ports 7. Each fuel injector valve 12 is arranged to inject fuel in the corresponding intake port 7 for the corresponding cylinder and can form two fuel sprays which are directed respectively to the two intake valves 7. Each fuel injector valve 12 is located at a central portion in the width of intake port 7 in the longitudinal direction of engine main body 1A, and installed to cylinder head 3 by being inserted into injector valve installation hole 10 which is obliquely formed in cylinder head 3 as shown in FIG. 2.

As illustrated in FIG. 2, in this instance, partition wall 13 is provided in intake port 7 so as to divide intake port 7 into upper and lower (two) air flow passages in order to strengthen the tumble flow within the cylinder. Intake air control valve 14 is disposed inside intake manifold 11 and located upstream of partition wall 13, and arranged to open and close the lower air flow passage in intake port 7. In this connection, each fuel injector valve 12 is so located and inclined that fuel spray passes through a position downstream of the downstream end of partition wall 13.

Blow-by gas recirculation system S includes a blow-by gas piping 15 through which blow-by gas from blow-by gas outlet 5 of cylinder head cover 4 is introduced to the respective intake ports 7 for the respective cylinders. The blow-by gas piping 15 includes blow-by gas main pipe 16 which is connected to blow-gas outlet 5 and extends in the longitudinal direction of engine main body 1A. Four branch pipes 17 are branched off from and connected to blow-by gas main pipe 16. Four branched pipes 17 lead respectively to intake ports 7. Blow-by gas main pipe 16 is formed of, for example, hard plastic or synthetic resin and is formed into a hollow pipe shape. Blow-by gas main pipe 16 is disposed along the upper section of cylinder head 3 in such a manner as to be adjacent the side wall of cylinder head cover 4. Additionally, blow-by gas main pipe 16 has opposite end portions fixed to boss section 18 at the side of cylinder head 3 as shown in FIG. 2.

Each branch pipe 17 is formed of, for example, a rubber tube and disposed along an imaginary vertical plane (not shown) perpendicular to the longitudinal direction of blow-by gas main pipe 16 as shown in FIG. 3. Additionally, each branch pipe 17 extends from the side portion of the outside surface of blow-by gas main pipe 16 toward the outside of engine main body 1A and curved generally C-shaped so as to have a lower tip end section which is connected to intake port 7 through connector tube 20 as shown in FIG. 2. Connector tube 20 is formed of a metal tube and disposed inclined similarly to fuel injector valve 12 in a manner to be press-fitted into connector insertion hole 19 which is opened at a portion of the wall surface above intake port 7 of cylinder head 3. It will be understood that the tip end section of branch pipe 17 formed of the rubber tube is fitted on this connector tube 20.

Figure 4:
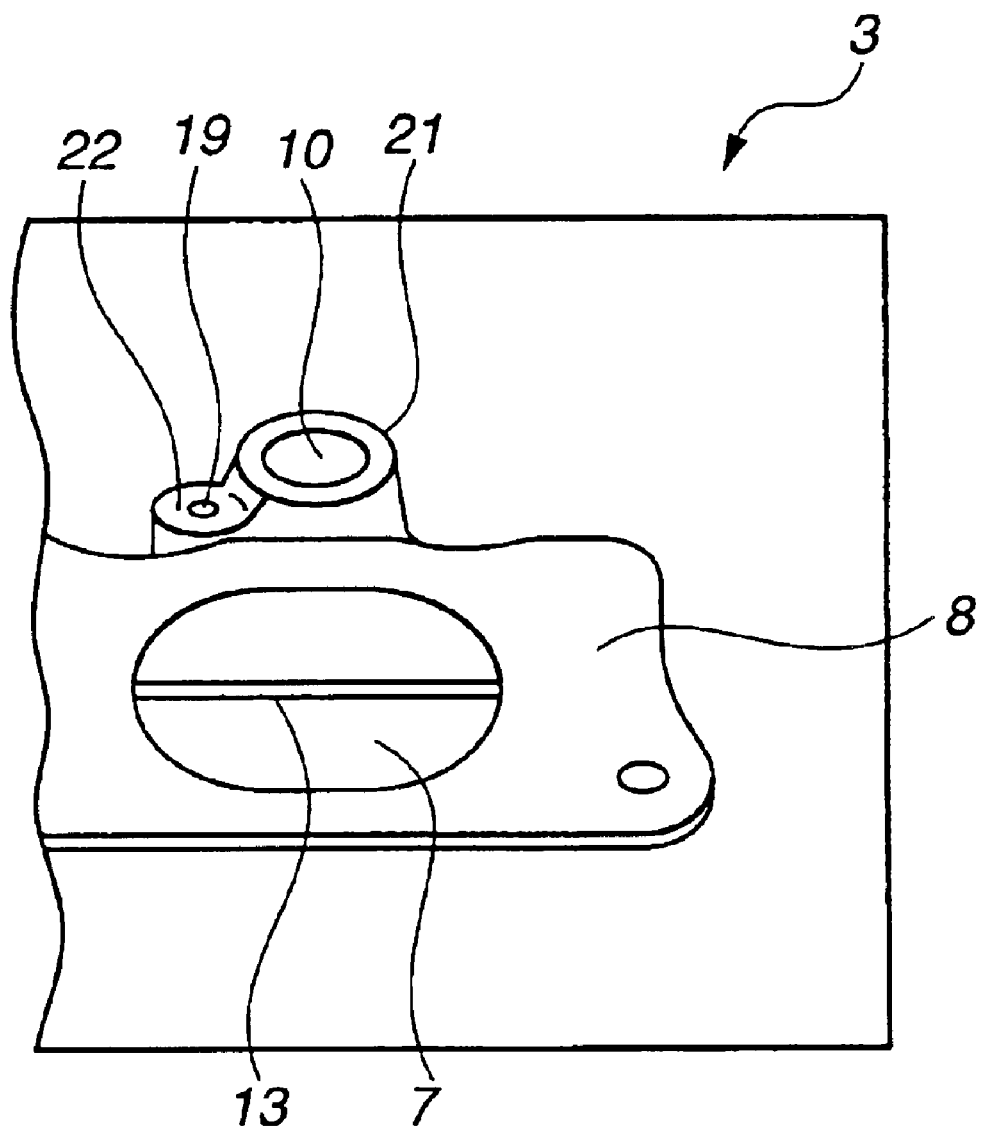
FIG. 4 is a fragmentary side view of an essential part of the cylinder head of the internal combustion engine of FIG. 1.

The tip end of connector tube 20 serves as a gas blowout opening and opens to the inside of intake port 7. This gas blowout opening is located upstream of the fuel ejection opening of fuel injector valve 12 within intake port 7. This gas blowout opening is located downstream of intake air control valve 14 located at the side of intake manifold 11, and therefore intake air control valve 14 can be prevented from being soiled with blow-by gas. Additionally, connector tube 20 is located adjacent fuel injector valve 12, so that, particularly shown in FIG. 4, generally cylindrical injector valve installation boss 21 having injector valve installation hole 10 for installation of fuel injector valve 12 is partly contiguous and integral with generally cylindrical blow-by gas supply boss 22 having connector tube insertion hole 19 into which connector tube 20 is inserted. Thus, injector valve installation boss 21 and blow-by gas supply boss 22 form an integral boss section which is integrally formed at the side surface of cylinder head 3. Injector valve installation hole 10 and connector tube insertion hole 19 are formed straight elongate and generally parallel with each other, and therefore they can be machined in the same direction relative to cylinder head 3 thus improving the operational efficiency in production of engine 1.

Here, as discussed above, each fuel injector valve 12 is located at the central portion of the width (dimension in the longitudinal direction of engine main body 1A) of the intake port 7 for each intake port 7 whereas each connector tube 20 is located one-sided in the width of intake port 7. More specifically, for each intake port 7, each branch pipe 17 is connected to connector tube 20 at a position one-sided to the center of engine main body 1A in the longitudinal direction of engine main body 1A relative to fuel injector valve 12. In other words, for Nos. 1 and 2 cylinders (indicated as "No. 1" and "No. 2" in FIG. 3), branch pipes 17 are located one-sided to No. 3 cylinder. In contrast, for Nos. 3 and 4 cylinders (indicated as "No. 3" and "No. 4" in FIG. 3), branch pipes 17 are located one-sided to No. 2 cylinder. Thus, for Nos. 1 and 4 cylinders which are located at the longitudinally opposite end sides (opposite end sections) of engine main body 1A, branch pipes 17 are located one-sided to the center in the longitudinal direction of engine main body 1A, and therefore the whole length of blow-by gas main pipe 16 is shortened.

As illustrated in FIGS. 2 and 3, intake manifold 11 formed of plastic or synthetic resin is installed to the intake manifold installation flange surface 8. This intake manifold 11 includes collector section 31 which is located above cylinder head 3 and elongates in the longitudinal direction of engine main body 1A. Four branch sections 32 extend from the side surface of collector section 31 to respectively reach intake ports 7 for the respective cylinders. Branch sections 32 are provided at their tip ends with a common flange 33 which extends in the longitudinal direction of engine main body 1A and continuous throughout intake ports 7 for all the cylinders. As shown in FIG. 3, four branch sections 32 have such slightly different shapes that a distance between the adjacent branch sections widens in the direction of from collector section 31 to cylinder head 3 as viewed from a direction perpendicular to the longitudinal direction of engine main body 1A. However, as shown in FIG. 2, four branch sections 32 have the generally same shape as viewed from a direction along the longitudinal direction of engine main body 1A. Thus, each branch section 32 extends from collector section 31 to the side of engine in such a manner as to traverse the upper side of cylinder head cover 4 and extends downward upon being curved generally C-shaped so as to be straightly connected to intake port 7. Intake manifold 11 formed of the plastic includes two counterparts which have been separately molded and are joined at a partition plane (not shown) by vibration welding or the like to form an one-piece structure of intake manifold 11, the partition plane being set according to the curved shape of branch sections 32. Accordingly, branch sections 32 are provided with joining flanges 34 which are relatively widely formed around the peripheries of branch sections 32 and are necessary to join the two counterparts of intake manifold 11. Thus, the two counterparts of intake manifold 11 have respectively flatly extending joining flanges 34 which face to each other and have been welded to each other. By this, four branch sections 32 take a state in which they are continuous with each other to form a structure like a partition wall as a whole. According to the instance shown in the figures, a slight clearance is formed between branch section 32 for No. 1 cylinder and branch section 32 for No. 2 cylinder, and between branch section 32 for No. 3 cylinder and branch section 32 for No. 4 cylinder; however, it is to be noted that these clearances are much smaller than clearances formed between adjacent branch sections of an intake manifold formed of metal.

In a condition where intake manifold 11 of the above-mentioned type is installed to cylinder head 3, space 36 is formed beside cylinder head 3 and surrounded by intake manifold 11 of the partition wall shape and located beside cylinder head 3. In other words, space 36 is defined between cylinder head 3 and intake manifold 11. Branch sections 32 traverse a space immediately above cylinder head cover 4, and therefore a clearance between branch sections 32 and cylinder head 3 is small. Here, the above-discussed blow-by gas piping 15 including blow-by gas main pipe 16 and four branch pipes 17 is accommodated within space 36 located inside intake manifold 11. Particularly, branch pipes 17 for Nos. 1 and 4 cylinders are located one-sided to the center in the longitudinal direction of engine main body 1A as discussed above, and therefore the whole of blow-by gas main pipe 16 and four branch pipes 17 is disposed within space 36 located inside intake manifold 11 without protruding over the opposite end sides of intake manifold 11 as viewed from the direction perpendicular to the longitudinal direction of engine main body 1A.

As appreciated from the above, with the arrangement of the above-mentioned embodiment of the internal combustion engine equipped with blow-by gas recirculation system S, blow-by gas piping 15 is covered with intake manifold 11 and therefore does not liable to undergo the cooling action of flowing air during running of the vehicle. Particularly in the above embodiment, engine 1 is forward and transversely mounted on the vehicle and provided with intake manifold 11 facing forward of the vehicle, so that the vehicle forward side of blow-by piping 15 is covered with partition wall-like branch sections 32 of intake manifold 11 thereby remarkably lowering the cooling action of flowing air during running of the vehicle. Additionally, fuel injector valves 12 serving as a heat source are present together with blow-by gas piping 15 within space 36 surrounded by intake manifold 11, and therefore blow-by gas piping 15 can be effectively warmed. Particularly, branch pipes 17 and the blow-by gas main pipe 16 are disposed in such a manner as to lie together as inside as possible in the longitudinal direction of engine main body 1A, so that heat generated by fuel injector valves 12 within space 36 can be effectively used. Additionally, the branch pipe 17 for each cylinder is located adjacent fuel injector valve 12 and therefore receives heat from fuel injector valve 12 under radiation or the like, accompanying that heat from fuel injector valve 12 is effectively transmitted to branch pipes 17 through integrally continuous bosses 21, 22 and metallic connector tube 20, thereby effectively heating branch pipes 17 each of which has small flow passage cross-sectional area. As a result, the inside of blow-by gas piping 15 can be securely prevented from icing in a cold district.

The entire contents of Japanese Patent Application P2003-109698 (filed Apr. 15, 2003) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An internal combustion engine comprising:

an engine main body including a cylinder head having intake ports, and a cylinder head cover;

fuel injector valves disposed to be directed respectively to the intake ports;

an intake manifold installed to a side surface of the cylinder head and outward curved to define a space between the intake manifold and the cylinder head; and a blow-by gas recirculation system for feeding blow-by gas introduced out of the cylinder head cover to each cylinder of the engine main body through an intake system, the blow-by gas recirculation system including a blow-by gas piping which extends from the cylinder head cover to the intake ports for the cylinders, the blow-by gas piping being accommodated within the space defined between the intake manifold and the cylinder head.

2. An internal combustion engine as claimed in claim 1, wherein the intake manifold is formed of plastic and includes a plurality of branch sections which are contiguous with each other to form a structure like a partition wall, wherein the blow-by gas piping is disposed inside the branch sections in the longitudinal direction of the engine main body.

3. An internal combustion engine as claimed in claim 1, wherein the fuel injector valves are installed to the cylinder head and respectively located above the intake ports, wherein the blow-gas piping includes a plurality of tip end sections which are located respectively adjacent the fuel injector valves and connected respectively to the intake ports.

4. An internal combustion engine as claimed in claim 3, wherein each of the tip end sections for the intake ports located at opposite end sections of the engine main body is located one-sided to center of the engine main body in the longitudinal direction of the engine main body relative to the corresponding fuel injector valve.

5. An internal combustion engine as claimed in claim 4, wherein each of the tip end sections for the intake ports located at other sections than the opposite end sections of the engine main body is located one-sided to the center of the engine main body in the longitudinal direction of the engine main body relative to the corresponding fuel injector valve.

6. An internal combustion engine as claimed in claim 3, wherein each tip end section of the blow-by gas piping is installed to a first boss formed integral with the cylinder head, wherein each fuel injector valve is installed to a second boss formed integral with the cylinder head, the second boss being contiguous and integral with the first boss.

7. An internal combustion engine as claimed in claim 3, wherein each tip end section of the blow-by gas piping is located upstream of a fuel ejection opening of the corresponding fuel injector valve with respect to gas flow within the intake port.

8. An internal combustion engine as claimed in claim 3, wherein the cylinder head is formed with a first elongate hole for installation of each fuel injector, and a second elongate hole for installation of each tip end section of the blow-by gas piping, the first and second elongate holes being generally parallel with each other.

9. An internal combustion engine as claimed in claim 1, further comprising a partition wall for dividing inside of each intake port into two axially extending air flow passages, and an intake air control valve disposed upstream of the partition wall to control air flow of one of the air flow passages, wherein each tip end section of the blow-by gas piping is connected to the corresponding intake port at a position downstream of the intake air control valve.

10. An internal combustion engine as claimed in claim 1, wherein the blow-by gas piping includes a blow-by gas main pipe disposed above the cylinder head and extends in the longitudinal direction of the engine main body, and a plurality of branch pipes which extend from the blow-gas main pipe and connected respectively to the intake ports.

\* \* \* \* \*